United States Patent [19]

Schnabel et al.

[11] 3,878,235

[45] Apr. 15, 1975

[54] CHLORINE CONTAINING METHYLENE BRIDGED DIARYL DIISOCYANATES

[75] Inventors: Wilhelm J. Schnabel; Maurice C. Raes, both of Branford, Conn.

[73] Assignee: Olin Corporation, New Haven, Conn.

[22] Filed: Nov. 15, 1973

[21] Appl. No.: 416,042

[52] U.S. Cl........ 260/453 AM; 260/2.5; 260/77.5 AT; 260/453 AR; 260/453 P
[51] Int. Cl............................................ C07c 119/04
[58] Field of Search............... 260/453 AR, 453 AM

[56] References Cited
UNITED STATES PATENTS

| 3,255,226 | 6/1966 | McShane, Jr. | 260/453 |
| 3,281,447 | 10/1966 | Knopf et al. | 260/453 |

*Primary Examiner*—Lewis Gotts
*Assistant Examiner*—Dolph H. Torrence
*Attorney, Agent, or Firm*—F. A. Iskander; T. P. O'Day

[57] ABSTRACT

Selected chlorine-containing methylene-bridged diaryl diisocyanates are disclosed which are useful in the production of cellular and non-cellular polyurethanes.

2 Claims, No Drawings

CHLORINE CONTAINING METHYLENE BRIDGED DIARYL DIISOCYANATES

This invention relates to a new and highly select group of chlorine-containing methylene-bridged diaryl diisocyanates and to the use of these diisocyanates in the preparation of polyurethanes.

Various aromatic and aliphatic-aromatic polyisocyanates have been known for their utility in the production of polyurethane foam. It has also been generally known that flame retardant properties can be achieved in a polyurethane foam by utilizing, in its preparation, a chlorinated polyisocyanate. However, according to the prior art, chlorine-containing aromatic and aliphatic-aromatic polyisocyanates generally are either very viscous liquids or, as is more often the case, solid. As such their use in polyurethane foam production, if at all practicable, entails costly and burdensome handling and processing measures which often render them unfeasible from an economic standpoint. For example, U.S. Pat. No. 3,360,539 discloses that the product of chlorinating an 80/20 isomer mixture of 2,4-and 2,6-toluene-diisocyanate is solid at room temperature. U.S. Pat. No. 2,945,875, which relates to the preparation of monochloro- and dichlorophenylene diisocyanate, again indicates that these chlorinated products are solid at room temperature.

It is further known in the art to prepare certain monomeric methylene-bridges diaryl polyisocyanates by condensing an aromatic or aliphatic aromatic isocyanate with selected aromatic compounds having a halomethyl substituent and which may also have one or more chlorine substituents on the aromatic ring. However, confirming earlier prior art findings, this patent indicates that the products of such condensation reaction are solid or viscous liquids.

Now, according to the invention, a novel and very select group of chlorine-containing methylene-bridged diaryl diisocyanates has been found which are not only liquid but also have a surprisingly low viscosity. The new compounds of the invention are selected from o-chlorobenzyltoluene diisocyanate and dichlorobenzyltoluene diisocyanate.

Further according to the invention, these novel diisocyanates, by virtue of their low toxicity and unexpectedly low viscosity, can be used to advantage in the preparation of polyurethane elastomers and foams.

The chlorine-containing diisocyanates of the invention can be prepared by condensing, in the presence of a Friedel-Crafts catalyst, toluene diisocyanate with the appropriate chlorine-substituted benzyl chloride. Thus the o-chlorobenzyl-toluene diisocyanate is obtained by condensing toluene diisocyanate with o-chlorobenzyl chloride in accordance with the following equation

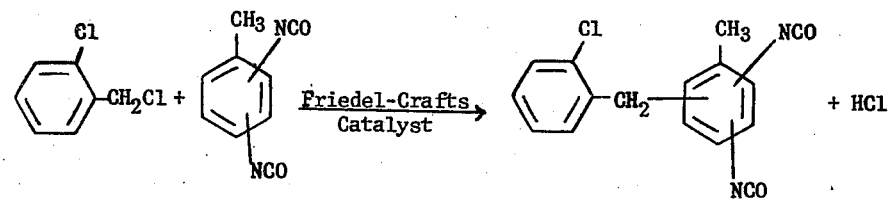

The dichlorobenzyl-toluene diisocyanate of the invention is similarly prepared by condensing toluene diisocyanate with dichlorobenzyl chloride as illustrated by the following equation

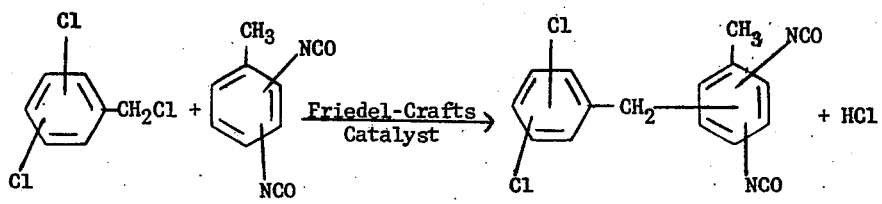

The above-illustrated reactions are carried out at a temperature within the range of 50°–250°C. and preferably using a large stoichiometric excess of the toluene diisocyanate. Completion of the reaction is usually signaled when the evolution of hydrogen chloride ceases. The chlorinated diisocyanate product is then recovered by conventional distillation methods. A more detailed description of this type of condensation reaction is provided in U.S. Pat. No. 3,255,226, issued June 7, 1966 to H. F. McShane, the entire disclosure of which is incorporated herein by reference.

The toluene diisocyanate reactant which is used to prepare the compounds of the invention can be any isomer or isomer mixture such as 2,4-toluene diisocyanate, 2,5-toluene diisocyanate, 2,6-toluene diisocyanate, 3,5-toluene diisocyanate and mixtures of one or more of these isomers. The preferred toluene diisocyanate isomers are 2,4-toluene diisocyanate, 2,6-toluene diisocyanate, and mixtures of these two isomers. For reasons of economy and commercial availability, a mixture of about 80 percent by weight of the 2,4-isomer and about 20 percent by weight of the 2,6-isomer is particularly preferred.

The other reactant used to prepare the diisocyanates of the invention is o-chlorobenzyl chloride or dichlorobenzyl chloride. The latter can be any isomer or mixture of isomers such as 2,3-dichlorobenzyl chloride, 2,4-dichlorobenzyl chloride, 2,5-dichlorobenzyl chloride, 2,6-dichlorobenzyl chloride, and 3,4-dichlorobenzyl chloride.

It is to be noted that the product of either of the two reactions illustrated above is quite often a mixture of isomers which may vary in proportion relative to oneanother. This has been found to be the case even in the condensation reaction of o-chlorobenzyl chloride with a single toluene diisocyanate isomer. The reason for this is believed to be that there is not a specific carbon atom on the aromatic ring of the toluene diisocyanate which will always become preferentially attached to the methylene bridge provided by the benzyl chloride reactant. Rather, as is more often the case, for every one molecule of benzyl chloride that is condensed with one molecule of toluene diisocyanate, the link could occur via any one of the three available carbons on the aromatic ring of the toluene diisocyanate; and it has been found that the identity and proportion of each isomeric condensation product cannot be uniformly controlled to such a degree as to ascertain the exact isomeric constitution of the total condensation product. For example, in condensing o-chlorobenzyl chloride with 2,4-toluene diisocyanate, the product that is obtained, rather than being a single isomer, is more likely to be a mixture of at least two isomers, namely, a major proportion of 2-chlorophenyl-3'-methyl-4',6'-diisocyanatophenyl-methane, and a lesser proportion of 2-chlorophenyl-2'-methyl-3',5'-diisocyanatophenyl-methane. And of course an even greater number of isomers would result where an isomeric mixture of the toluene diisocyanate reactant is used; or where, in the case of the dichlorobenzyl-toluene diisocyanate, this is prepared from an isomeric mixture of dichlorobenzyl chloride.

Thus it is to be understood that the term "o-chlorobenzyl-toluene diisocyanate," as used in the specification and claims herein, is intended to encompass an isomeric mixture of this compound as well as a single isomer thereof. The same statement of course applies to the term "dichlorobenzyl toluene diisocyanate."

The following compounds, and mixtures thereof, are illustrative of o-chlorobenzyl-toluene diisocyanates of the invention:

2-chlorophenyl-3'-methyl-4',6'-diisocyanatophenyl-methane
2-chlorophenyl-2'-methyl-3',5'-diisocyanatophenyl-methane
2-chlorophenyl-3'-methyl-2',4'-diisocyanatophenyl-methane
2-chlorophenyl-4'-methyl-3',5'-diisocyanatophenyl-methane The following compounds, and mixtures thereof, are illustrative of the dichlorobenzyl-toluene diisocyanates of the invention:

2,4-dichlorophenyl-3'-methyl-4',6'-diisocyanatophenyl-methane
2,4-dichlorophenyl-2'-methyl-3',5'-diisocyanatophenyl-methane
2,5-dichlorophenyl-2'-methyl-3',5'-diisocyanatophenyl-methane
2,4-dichlorophenyl-3'-methyl-2',4'-diisocyanatophenyl-methane
2,5-dichlorophenyl-3'-methyl-2',4'-diisocyanatophenyl-methane
2,4-dichlorophenyl-4'-methyl-3',5'-diisocyanatophenyl-methane
2,5-dichlorophenyl-4'-methyl-3',5'-diisocyanatophenyl-methane
2,5-dichlorophenyl-3'-methyl-4',6'-diisocyanatophenyl-methane
2,3-dichlorophenyl-3'-methyl-4',6'-diisocyanatophenyl-methane The most preferred dichlorobenzyl-toluene diisocyanates of the invention are 2,4-dichlorophenyl-3'-methyl-4',6'-diisocyanatophenyl-methane; 2,4-dichlorophenyl-4'-methyl-3',5'-diisocyanatophenyl-methane; 2,5-dichlorophenyl-3'-methyl-4',6'-diisocyanatophenyl-methane; 2,3-dichlorophenyl-3'-methyl-4',6'-diisocyanatophenyl-methane; and mixtures thereof.

Because of its unexpectedly low viscosity, i.e., usually below 110 cps. at 25°C, the preferred chlorinated diisocyanate of the invention is o-chlorobenzyl-toluene diisocyanate as illustrated above. Particularly preferred is the isomeric mixture which is condensate of o-chlorobenzyl chloride and a mixture of 2,4- and 2,6-toluene diisocyanate.

In addition to their surprisingly low viscosity, the chlorine-containing diisocyanates of the invention are of low volatility and therefore are less toxic than toluene diisocyanate. As such, they can be used to advantage, according to the invention, in the production of cellular and noncellular polyurethane. For example, they can be reacted with a polyol, in the presence of a catalyst and a foaming agent, to produce flame retardant polyurethane foams which are useful in various cushioning and insulating applications.

The following examples are provided to illustrate the invention. In these examples, all parts and percentages are by weight unless otherwise specified.

EXAMPLE 1

In a reaction vessel, equipped with a thermometer, a stirrer, a reflux condensor and a nitrogen gas inlet tube, there were placed 966 grams (6 moles) of o-chlorobenzyl chloride, 20 grams of anhydrous aluminum chloride and 2,612 grams (15 moles) of an 80/20 by weight isomer mixture of 2,4-/2,6-toluene diisocyanate. The agitated mixture was heated to 160°C while a slow stream of dry nitrogen gas was passed through it. Hydrogen chloride, which was evolved during the reaction, was removed with the out-flowing nitrogen gas stream, and it was subsequently captured in a separate vessel where it was absorbed in water. After about 6 hours, the evolution of hydrogen chloride ceased. The total yield of this gas was determined, by titration with a base, to represent 67.5 percent of theory based on complete reaction of the o-chlorobenzyl chloride. Substantially all of the unreacted toluene diisocyanate was removed by distillation. Fractional distillation of the remaining reaction product mixture yielded 865 grams of pure, colorless liquid product distilling at 180°–182°C and 0.5–1.0 mm of mercury pressure. NCO titration of this product gave 27.6% NCO as compared with a calculated theoretical value in o-chlorobenzyl-toluene diisocyanate of 28.1 percent. The identity and structure of the o-chlorobenzyl-toluene diisocyanate product were confirmed by mass spectrometry (MS), nuclear magnetic resonance (NMR), and vapor phase chromatography (VPC). The analytical tests also showed the presence of several isomers of o-chlorobenzyl-toluene diisocyanate.

The product o-chlorobenzyl-toluene diisocyanate had a measured viscosity at 25°C of 75 cps. The product was allowed to stand for more than 3 months at room temperature and checked again. There was no evidence of any solidification. Rather the product remained to be all-liquid with an unchanged viscosity of 75 cps. at 25°C.

COMPARISON 1 p-chlorobenzyl-toluene diisocyanate was prepared by the same procedure as used in Example 1 except that instead of the o-chlorobenzyl chloride reactant, p-chlorobenzyl chloride was used. The product was initially all liquid of low viscosity. However, on letting this product stand at room temperature for 2 days, a substantial proportion of it solidified.

This comparison is provided to show the drastic and unexpected difference in the product depending on the location of the chlorine on the benzene ring. Thus whereas the o-chlorobenzyl-toluene diisocyanate of the invention is a stable liquid of very low viscosity, the p-chlorobenzyl-toluene diisocyanate is not a stable liquid but exhibits partial solidification on standing.

EXAMPLE 2

The procedure of Example 1 was repeated except that instead of the mixture of 2,4- and 2,6-toluene diisocyanate, 2,4-toluene diisocyanate was used. The o-chlorobenzyl-toluene diisocyanate product had a measured viscosity at 25°C of 108 cps. At the end of 3 weeks, during which this product was allowed to stand at room temperature, no evidence of solidification was noted. Rather the product remained all-liquid with a viscosity of 108 cps. at 25°C.

COMPARISON 2

The procedure of Example 2 was followed using, instead of o-chlorobenzyl chloride, p-chlorobenzyl chloride. The product p-chlorobenzyl-toluene diisocyanate was a low-viscosity liquid; however, on standing at room temperature overnight, it completely solidified.

EXAMPLE 3

The procedure of Example 1 was used to prepare 2,4-dichlorobenzyl-toluene diisocyanate, using 1,173 grams (6 moles) of 2,4-dichlorobenzyl chloride instead of the 966 grams of o-chlorobenzyl chloride as used in Example 1. The structure and identity of the 2,4-dichlorobenzyl-toluene diisocyanate product were confirmed by MS, NMR, NCO titration and VPC. This product was a stable liquid having a measured viscosity, at 25.7°C, of 373 cps.

What is claimed is:

1. A chlorine-containing, methylene-bridged diaryl diisocyanate selected from the group consisting of ortho-chlorobenzyl-toluene diisocyanate and dichlorobenzyl-toluene diisocyanate.

2. A diisocyanate as claimed in claim 1 identified as ortho-chlorobenzyl-toluene diisocyanate.

* * * * *